United States Patent
Kavak et al.

(10) Patent No.: US 7,411,899 B2
(45) Date of Patent: Aug. 12, 2008

(54) APPARATUS AND METHOD FOR ALLOCATING WALSH CODES TO ACCESS TERMINALS IN AN ADAPTIVE ANTENNA ARRAY CDMA WIRELESS NETWORK

(75) Inventors: Adnan Kavak, Izmit (TR); Joseph R. Cleveland, Richardson, TX (US)

(73) Assignee: Samsung Electronics Co. Ltd., Suwon-si (KR)

(*) Notice: Subject to any disclaimer, the term of this patent is extended or adjusted under 35 U.S.C. 154(b) by 1261 days.

(21) Appl. No.: 10/078,277

(22) Filed: Feb. 19, 2002

(65) Prior Publication Data

US 2002/0146029 A1 Oct. 10, 2002

Related U.S. Application Data

(60) Provisional application No. 60/282,059, filed on Apr. 6, 2001.

(51) Int. Cl.
*H04J 11/00* (2006.01)
(52) U.S. Cl. ............... 370/209; 370/342; 370/441; 375/135

(58) Field of Classification Search ............ 370/208, 370/230, 311, 320, 329, 333, 342, 441; 375/135, 375/136
See application file for complete search history.

(56) References Cited

U.S. PATENT DOCUMENTS

| | | | | | |
|---|---|---|---|---|---|
| 5,864,548 | A | * | 1/1999 | Liu | 370/320 |
| 6,031,877 | A | * | 2/2000 | Saunders | 375/267 |
| 6,122,260 | A | * | 9/2000 | Liu et al. | 370/280 |
| 6,163,524 | A | * | 12/2000 | Magnusson et al. | 370/208 |
| 6,388,998 | B1 | * | 5/2002 | Kasturia | 370/320 |
| 6,477,158 | B1 | * | 11/2002 | Take | 370/335 |
| 6,700,881 | B1 | * | 3/2004 | Kong et al. | 370/335 |
| 6,876,690 | B1 | * | 4/2005 | Imbeni et al. | 375/130 |
| 6,996,056 | B2 | * | 2/2006 | Chheda et al. | 370/209 |
| 2003/0016737 | A1 | | 1/2003 | Wu et al. | 375/224 |

* cited by examiner

*Primary Examiner*—Chi Pham
*Assistant Examiner*—Donald L Mills

(57) ABSTRACT

An apparatus having: 1) a database for storing R active wireless terminal records, each of the R active wireless terminal records containing: a) an active orthogonal code and b) corresponding downlink beamforming coefficients used to communicate with one of the wireless access terminals; and 2) a controller associated with the database that receives a notification that a new wireless access terminal is accessing the base station and, in response to the notification, compares each of the R active wireless terminal records to new downlink beamforming coefficients associated with the new wireless access terminal. The controller determines at least one active wireless terminal record containing corresponding downlink beamforming coefficients that have the least correlation with the new downlink beamforming coefficients.

24 Claims, 4 Drawing Sheets

APPARATUS AND METHOD FOR ALLOCATING WALSH CODES TO ACCESS TERMINALS IN AN ADAPTIVE ANTENNA ARRAY CDMA WIRELESS NETWORK

The present invention claims priority to U.S. Provisional Application Ser. No. 60/282,059 filed Apr. 6, 2001.

TECHNICAL FIELD OF THE INVENTION

The present invention is directed, in general, to digital communication systems and, more specifically, to an apparatus and method for dynamic allocation of Walsh codes in an adaptive antenna array (AAA) CDMA base transceiver station (BTS) utilizing spatial diversity for communications links with mobile users to support a traffic channel count greater than the Walsh code limit such as that found 2G (IS-95) systems, with a limit of 64, or in 3G (IS2000) systems, with limits of either 64 or 128.

BACKGROUND OF THE INVENTION

The radio frequency (RF) spectrum is a limited commodity. Only a small portion of the spectrum can be assigned to each communications industry. The assigned spectrum, therefore, must be used efficiently in order to allow as many frequency users as possible to have access to the spectrum. Multiple access modulation techniques are some of the most efficient techniques for utilizing the RF spectrum. Examples of such modulation techniques include time division multiple access (TDMA), frequency division multiple access (FDMA), and code division multiple access (CDMA).

CDMA modulation employs a spread spectrum technique for the transmission of information. The CDMA wireless communications system spreads the transmitted signal over a wide frequency band. This frequency band is typically substantially wider than the minimum bandwidth required to transmit the signal. A signal having a bandwidth of only a few kilohertz can be spread over a bandwidth of more than a megahertz.

All of the wireless access terminals, including both mobile stations (e.g., cell phone) and fixed terminals, that communicate in a CDMA system transmit on the same frequency. In order for the base station to identify the wireless access terminals, each wireless access terminal is assigned a unique pseudo-random (PN) long spreading code that identifies that particular wireless access terminal to the wireless network. Typically, each long code is generated using the electronic serial number (ESN) of each mobile station or fixed terminal. The ESN for each wireless access terminal is unique to that wireless access terminal.

Similarly, each sector of a base station uses a unique short code (containing $2^{15}$ bits) to identify itself to access terminals. Those familiar with the art will recognize that a sector is defined by the coverage provided by the pilot, paging and synch overhead channels transmitted by the BTS for both non-adaptive and adaptive antenna systems.

In a preferred implementation, the user data to be transmitted to a wireless access terminal is first framed, convolutionally encoded, repeated, interleaved, and encoded with the long code to form a baseband signal. The baseband signal is then separated into an in-phase (I) component and a quadrature (Q) component prior to quadrature modulation of an RF carrier and transmission. The I-component and Q-component are spread with a unique Walsh code of length $M=2^N$ uniquely assigned to each access terminal assigned to a traffic channel in the sector. The I-component is modulated by a time-offset short pseudo-random noise (I-PN) binary code sequence derived from the short code of length $2^{15}$ bits. The Q-component is modulated by a time-offset short pseudo-random noise (Q-PN) binary code sequence derived from the short code of length $2^{15}$ bits. In an alternate embodiment, the quadrature binary sequence may be offset by one-half of a binary chip time. Those skilled in the art will recognize that the in-phase component and the quadrature component are used for quadrature phase shift keying (QPSK) modulation of an RF carrier prior to transmission.

The maximum capacity of a base transceiver station in a CDMA wireless network is limited by the number of unique orthogonal codes (Walsh codes) that are available for assignment to traffic channels in each sector. The number of orthogonal codes available for traffic channel assignment is limited to 56-61 for IS-95; to 56-61 for Radio Configuration 1, 2 or 3 of IS-2000; and 119-125 for Radio Configuration 4 or higher in IS-2000, depending on the number of paging channels assigned. The codes allocated to traffic channels may support either voice or packet data services.

Those acquainted with the art will recognize that the number of simultaneous traffic channels supported over the RF links to wireless access terminals depends on the propagation environment experienced by the access terminals. For a typical, good propagation mobile environment (defined in the art as Vehicular B model), the EVRC capacity supported on the forward and reverse RF links is approximately 24 Erlangs per CDMA carrier per sector in a three-sector antenna configuration. A traffic load of 24 Erlangs corresponds to 34 EVRC traffic channels with a 1% blocking probability. With an average soft handoff capacity gain of 40%, this requires 48 Walsh codes per sector on the forward link. A handoff gain of 60%, which may occur in some dense urban or highly congested areas, would require up to 54 Walsh codes.

For a wireless mobile application, the voice traffic capacity for EVRC vocoding may be as high is 65 Erlangs, or 80 traffic channels with a 1% blocking probability. For an adaptive antenna array base transceiver subsystem, a capacity increase of two to four times (i.e., 2× to 4×) translates into a requirement for up to 192 Walsh codes for 40% soft handoff gain and up to 216 Walsh codes for 60% soft handoff gain. In a non-mobile, wireless application, up to 320 Walsh codes are required. Thus, there are numerous scenarios in which the number of channels supported over the air exceeds the limit of 64 available Walsh codes for Radio Configuration 3 or lower or 128 available Walsh codes for Radio Configuration greater than 3.

Quasi-orthogonal codes have been used for increasing Walsh code availability. However, this technique results in degraded performance and lower-than-expected RF capacity due to requirements for greater Eb/No at the receiver. Another prior art method includes a segmentation of the coverage area into six sectors in non-adaptive antenna systems, which allows greater Walsh code reuse. However, the result is greater handoff transitions and increased probability of dropped calls. Those familiar with the art will recognize that doubling the number of sectors does not allow a doubling of Walsh code reuse due to the number of codes required to support soft handoff and due to added overlap regions of adjacent sector antenna patterns. However, this method is not applicable for an adaptive antenna array base transceiver subsystem (BTS) in which multiple antennas and a baseband AAA processor module are employed per sector.

Therefore, there is a need for improved CDMA wireless networks in which the number of users per sector is not limited by the number of available Walsh codes. In particular, there is a need for a wireless CDMA adaptive antenna array base station that can more efficiently use the available Walsh codes by dynamically allocating Walsh codes in the base station sectors so that a single Walsh code may be used to communicate simultaneously with two or more wireless access terminals within the same sector. More particularly, there is a need for a CDMA wireless base station that can dynamically allocate Walsh codes in beams formed by adaptive antenna arrays of the base station so that a single Walsh code may be used to communicate simultaneously with two or more wireless access terminals in the same sector.

SUMMARY OF THE INVENTION

The present invention provides an apparatus and method for using the spatial isolation provided by an adaptive antenna array to maximize the re-use of Walsh codes in a base transceiver subsystem of a wireless network base station. This allows the BTS to support the full capacity of the air interface in adaptive antenna array operation so that the capacity is not constrained by the 64 or 128 Walsh code limit.

To address the above-discussed deficiencies of the prior art, it is a primary object of the present invention to provide an apparatus for allocating orthogonal codes used for downlink transmissions to a plurality of wireless access terminals for use in a base station of a code division multiple access (CDMA) wireless network, wherein the base station communicates with the plurality of wireless access terminals using transmit beams formed by an adaptive antenna array. According to an advantageous embodiment of the present invention, the apparatus comprises: 1) a database capable of storing R active wireless terminal records, each of the R active wireless terminal records containing: a) an active orthogonal code and b) corresponding downlink beamforming coefficients used to communicate with one of the wireless access terminals; and 2) a controller associated with the database capable of receiving a notification that a new wireless access terminal is accessing the base station and, in response to the notification, comparing the each of the R active wireless terminal records to new downlink beamforming coefficients suitable for forming a downlink transmit beam for transmitting to the new wireless access terminal and, in response to the comparison, determines at least one active wireless terminal record containing corresponding downlink beamforming coefficients that have the least correlation with the new downlink beamforming coefficients.

According to one embodiment of the present invention, the controller assigns an active orthogonal code in at least one active wireless terminal record to be used in downlink transmissions to the new wireless access terminal.

According to another embodiment of the present invention, the base station uses up to K orthogonal codes for the downlink transmissions and the controller compares each of the R active wireless terminal records to the new downlink beamforming coefficients in response to a determination that all of the K orthogonal codes are in use.

According to still another embodiment of the present invention, the controller determines a first plurality of active wireless terminal records containing corresponding downlink beamforming coefficients that have the least correlation with the new downlink beamforming coefficients and further determines from the first plurality of active wireless terminal records a first active wireless terminal record containing an active orthogonal code used for downlink transmissions to a least number of the plurality of wireless access terminals.

According to yet another embodiment of the present invention, the controller assigns the active orthogonal code in the first active wireless terminal record to be used in downlink transmissions to the new wireless access terminal.

According to a further embodiment of the present invention, the base station is operable to communicate in S sectors of a cell site associated with the base station and the base station uses up to K orthogonal codes in each of the S sectors for the downlink transmissions and wherein the controller compares each of the R active wireless terminal records to the new downlink beamforming coefficients in response to a determination that all of the K orthogonal codes are in use in a first sector in which the new wireless access terminal is accessing the base station.

According to a still further embodiment of the present invention, the controller determines a first plurality of active wireless terminal records containing corresponding downlink beamforming coefficients that have the least correlation with the new downlink beamforming coefficients and further determines from the first plurality of active wireless terminal records a first active wireless terminal record containing an active orthogonal code used for downlink transmissions to a least number of the plurality of wireless access terminals.

According to a yet further embodiment of the present invention, the controller assigns the active orthogonal code in the first active wireless terminal record to be used in downlink transmissions to the new wireless access terminal.

In one embodiment of the present invention, the controller receives the new downlink beamforming coefficients from a beamforming controller that determines the new downlink beamforming coefficients from an uplink signal transmitted by the new wireless is access terminal.

In another embodiment of the present invention, the base station is operable to communicate in S sectors of a cell site associated with the base station and the new wireless access terminal is being handed off from a first sector of the cell site to a second sector of the cell site, wherein each of the R active wireless terminal records are associated with the second sector and the controller receives the new downlink beamforming coefficients from active wireless terminal records associated with the first sector.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network base station.

Figure 1:
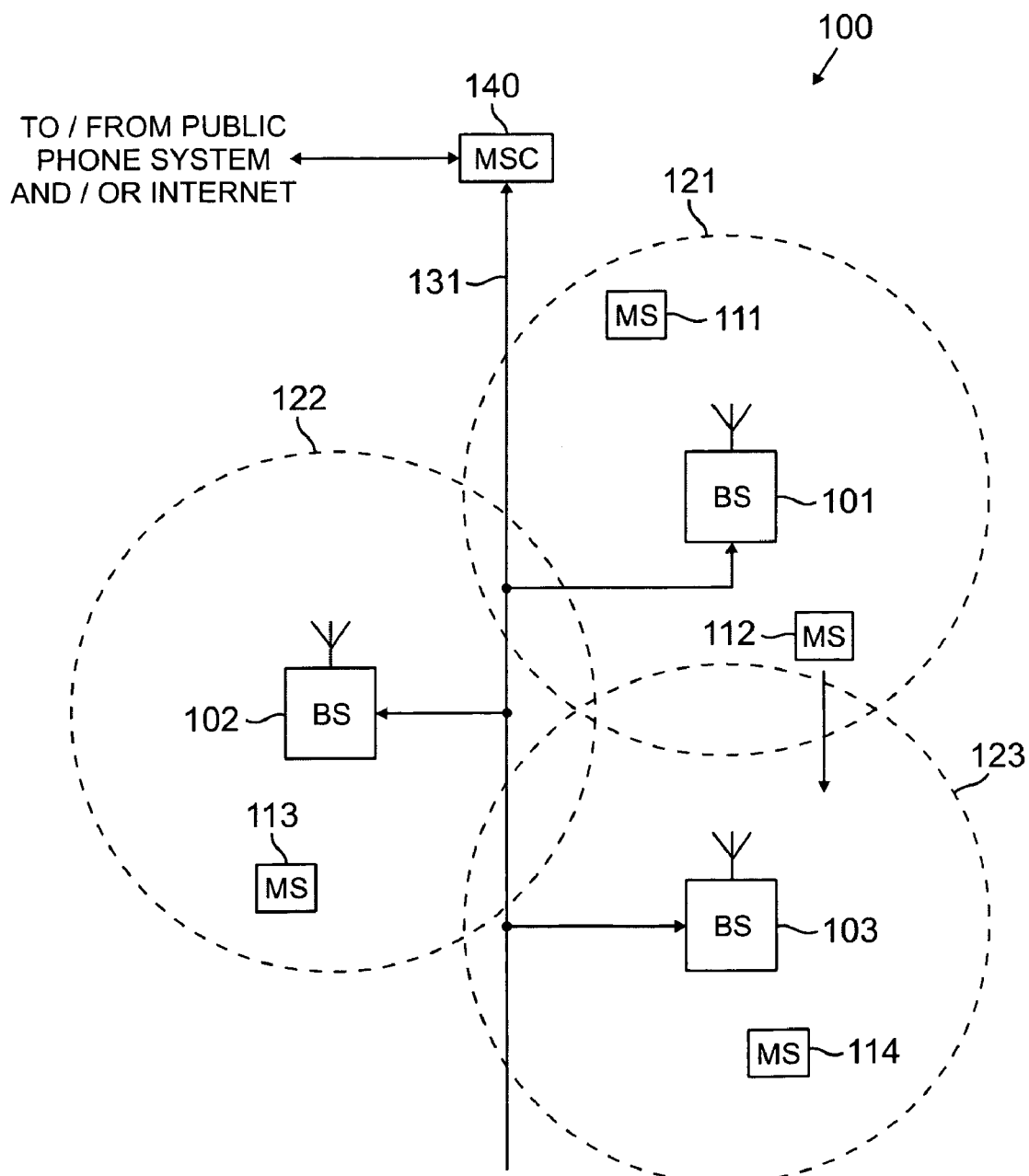
FIG. 1 illustrates an exemplary wireless network according to one embodiment of the present invention.

FIG. 1 illustrates exemplary wireless network 100 according to one embodiment of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over, for example, code division multiple access (CDMA) channels. Mobile stations 111-114 may be any suitable wireless access terminals, including conventional cellular phones, PCS handset devices, personal digital assistants, portable computers, or metering devices. The present invention is not limited to mobile devices. Other types of wireless access terminals, including fixed wireless terminals, may be used. However, for the sake of simplicity, only mobile stations are shown and discussed hereafter.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors, each sector being illuminated by a directional antenna coupled to the base station. Those acquainted with the art will recognize that the coverage provided by the overhead signals (pilot, paging and synch channel) transmitted by each sector directional antenna determines the sector geometry and coverage. Each sector of a base station uses a unique short code (containing $2^{15}$ bits) as a modulation or spreading code to identify itself to access terminals. The embodiment of FIG. 1 illustrates the base station in the center of the cell. Alternate embodiments position the directional antennas in corners of the sectors. The system of the present invention is not limited to any one cell site configuration.

In one embodiment of the present invention, BS 101, BS 102, and BS 103 comprise a base station controller (BSC) and one or more base transceiver subsystem(s) (BTS). Base station controllers and base transceiver subsystems are well known to those skilled in the art. A base station controller is a device that manages wireless communications resources, including the base transceiver stations, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communications line 131 and mobile switching center MSC 140. Line 131 also provides the connection path to transfers control signals between MSC 140 and BS 101, BS 102 and BS 103 used to establish connections for voice and data circuits between MSC 140 and BS 101, BS 102 and BS 103.

Communications line 131 may be any suitable connection means, including a T1 line, a T3 line, a fiber optic link, a network packet data backbone connection, or any other type of data connection. Line 131 links each vocoder in the BSC with switch elements in MSC 140. Those skilled in the art will recognize that the connections on line 131 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on line 131 may a provide a transmission path for transmission of analog or digital control signals in a suitable signaling protocol.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

As is well known, the hand-off procedure transfers control of a call from a first cell site to a second cell site. As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft hand-off process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103.

The above-described soft hand-off assumes the mobile station is in a voice or data call. An idle hand-off is a hand-off of a mobile station, between cells sites, that is communicating in the to control or paging channel.

Figure 2:
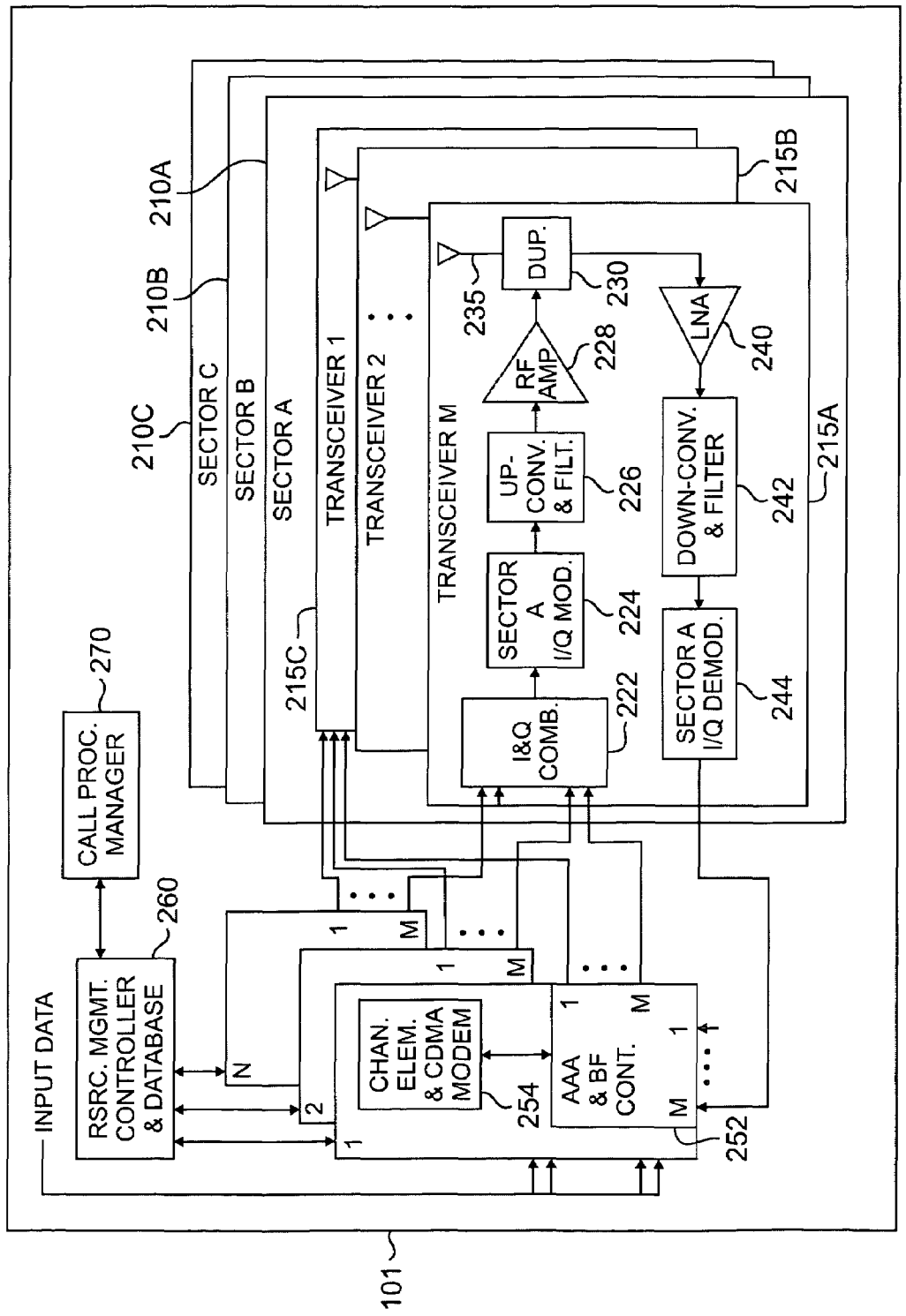
FIG. 2 illustrates selected portions of an exemplary base station according to one embodiment of the present invention.

FIG. 2 illustrates selected portions of the base transceiver subsystem (BTS) of exemplary base station 101. According to an advantageous embodiment of the present invention, base station 101 is divided into three sectors, referred to arbitrarily as Sector A, Sector B, and Sector C. Each sector is covered by an adaptive antenna array that uses up to M antennas to form transmit beams that directionally transmit voice and data from the base station to one or more mobile stations in the forward channel (i.e., downlink traffic). Base station 101 comprises Sector A transceiver unit 210A, Sector B transceiver unit 210B, and Sector C transceiver unit 210C, N channel element and CDMA units 254, N adaptive antenna array (AAA) and beamforming (BF) controllers 252, resource management controller and database 260 and call processing manager 270.

Sector A transceiver unit 210A, Sector B transceiver unit 210B, and Sector C transceiver unit 210C, N channel element and CDMA units 254, N adaptive antenna array (AAA) and beamforming (BF) controllers 252 operate like a conventional three sector, adaptive antenna array BTS with respect to communicating with wireless access terminals (i.e., mobile stations) in the forward channel using transmit beams. However, resource management controller and database 260 provides base station 101 with unique and novel capabilities for using the same Walsh code (or other orthogonal code) to communicate simultaneously with two or more wireless access terminals within the same sector and in different sectors of base station 101. Resource management controller and database 260 comprises a processor and memory that execute an algorithm that performs resource management in the adaptive antenna array BTS of base station 101. As will be explained below in greater detail, the algorithm is based on spatial isolation of mobile users which fall into different downlink beams in the same sector or in adjacent sectors of the same BTS.

Since Sector B transceiver unit 210B and Sector C transceiver unit 210C are substantially similar to Sector A transceiver unit 210A, only Sector A transceiver unit 210A is illustrated and discussed in detail hereafter. Sector A transceiver unit 210A comprises M transceivers, including exemplary transceivers 215A, 215B, and 215C, which are arbitrarily labeled Transceiver M, Transceiver 2, and Transceiver 1, respectively. Since transceivers 215B and 215C are substantially similar to transceiver 215A, only transceiver 215A is illustrated and discussed in detail hereafter.

The transmit path of transceiver 215A comprises in-phase (I) and quadrature (Q) combiner block 222, Sector A I/Q modulator 224, up-converter and filter block 226, radio frequency (RF) amplifier 228, duplexer 230, and antenna 235. The receive path of transceiver 215A comprises antenna 235, duplexer 230, low-noise amplifier (LNA) 240, down-converter and filter block 242, and Sector A demodulator 244. Compared to a prior art, non-adaptive BTS, the adaptive antenna array of the BTS of base station 101 employs multiple antennas 235 and multiple (up to M) transceiver units 210 and adaptive antenna array (AAA) and beamforming (BF) controllers 252 to transmit directed beams in the forward channel (i.e., downlink).

In the reverse channel (uplink) from a mobile station (MS), the signals received by the multiple antennas (antenna array) 235 are amplified by LNA 240, filtered and down-converted by down-converter and filter block 242, and demodulated into digital in-phase (I) and quadrature (Q) streams by Sector A demodulator 244. Duplexer (DUP) 230 provides isolation of transmitted and received signals. The digital I and Q streams are fed to a CDMA modem for despreading and M-ary symbol detection. Beamforming controller 252 determines the beam forming coefficients of the beamforming vector that describes the angle of arrival and beam characteristics of the signal received from each mobile terminal.

During the uplink, adaptive antenna array and beamforming controller 252 estimates over several symbol periods the phase (i.e., time offset) and signal strength of the received uplink signals at each antenna element from each mobile station and determines uplink and downlink beamforming (BF) weight vector coefficients for each mobile station. Adaptive antenna array and beamforming controller 252 passes the beamforming coefficient information to resource management controller and database 260, which stores them in a database table. Reception of an access signal by the uplink on a specific sector and receiver and detection circuit path is also identified to resource management controller and database 260. Resource management controller and database 260 uses this information to assign the corresponding sector path for the downlink.

Resource management controller and database 260 communicates with call processing manager 270 in order to assign a channel element, a Walsh code and a sector for each traffic channel established between the BTS and a mobile station. Resource management controller and database 260 maintains a database in memory for the beamforming coefficients, idle/active state of each Walsh code, and the assignment of that Walsh code to an active channel. Each channel element and CDMA modem 254 is capable of to supporting the signal processing for N users.

Figure 4:
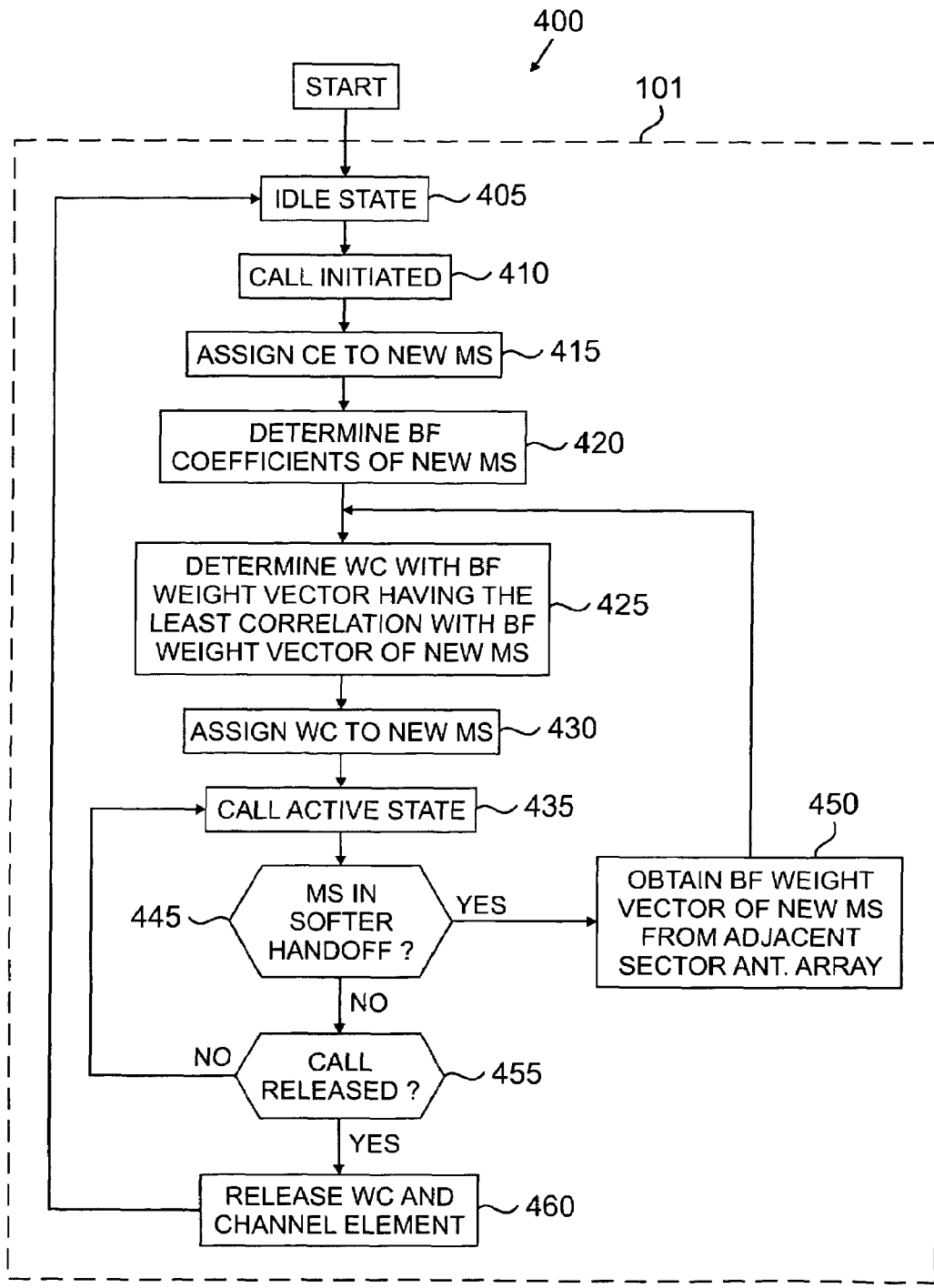
FIG. 4 is a flow diagram illustrating the operation of the exemplary base station according to one embodiment of the present invention.

For the downlink to the wireless access terminal (i.e., mobile station), the incoming I and Q data streams to the channel element are first processed in the CDMA modem, which selects the Walsh code (WC) according to the algorithm described in FIG. 4. The channel element and CDMA modem provides Walsh code modulation and PN code spreading on the downlink. Next, the modem output is multiplied by a Mx1 downlink beamforming weight vector for the mobile station in adaptive antenna array and beamforming controller 252 and is distributed to M antenna 235 for transmission in a given sector.

Adaptive antenna array and beamforming controller 252 performs amplitude weighting and phase shifting of the digital I and Q data fo each mobile station and conversion into Mx1 vector form. I and Q combiner 222 combines digital I and Q streams from N channel element and CDMA modem units 254. The combined I and Q signals from I and Q combiner 222 are applied to Sector A I/Q modulator 224, which modulates a carrier signal. The modulated carrier signal is upconverted and filtered by up-converter and filter block 226, amplified by RF amplifier 228, and sent to each antenna element 235 via duplexer 230. Finally, the signals at the antenna array are transmitted to the mobile station.

Figure 3:
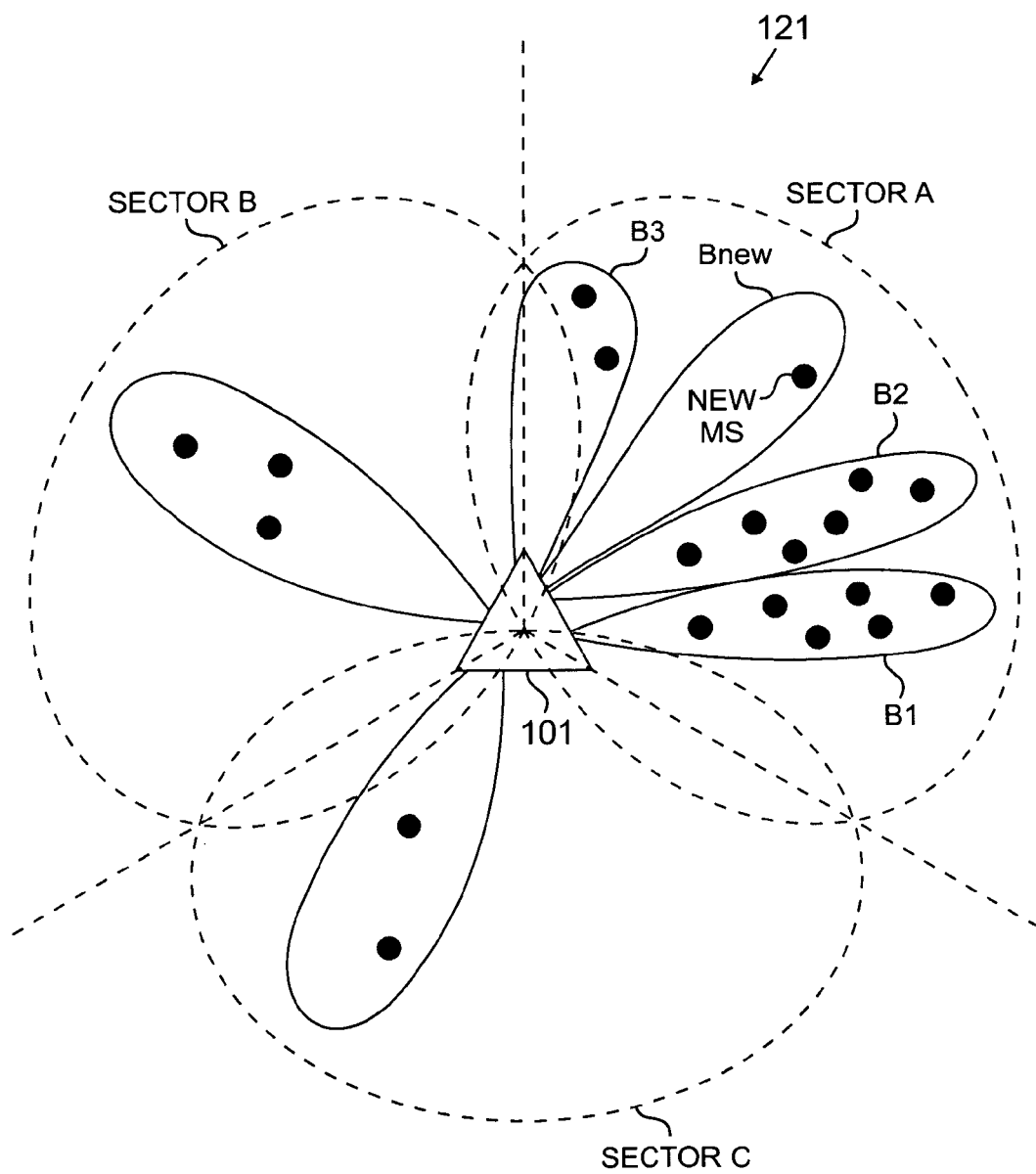
FIG. 3 illustrates various exemplary transmit beams associated with different sectors of the exemplary base station according to one embodiment of the present invention.

FIG. 3 illustrates various exemplary transmit beams transmitted by exemplary base station 101 into different sectors of cell site 121 according to one embodiment of the present invention. Mobile stations are represented by black dots in FIG. 3. Sector A contains three existing transmits beams, B1, B2, and B3. A new mobile station (NEW MS) that is accessing base station 101 is shown disposed within a new beam, B (New), to be formed by base station 101, as explained below in greater detail.

FIG. 4 depicts flow diagram 400, which illustrates the operation of exemplary base station 101 according to one embodiment of the present invention. Initially, resource management controller and database 260 is in an idle state, in which execution of the Walsh code (WC) allocation algorithm is not required for resource assignment (process step 405). At some point, call processing manager 270 signals resource management controller and database 260 to allocate resources for a traffic channel (process step 410). Next, resource management controller and database 260 executes a hashing function or some other selection algorithm in order to assign a physical channel element (CE) to the new mobile station from the set of idle channel elements stored in resource management controller and database 260 (process 415).

Adaptive antenna array and beamforming controller 252 then estimates the beamforming coefficients of the new mobile station from the reverse channel (i.e., uplink) signals for the new mobile station (process step 420). Resource management controller and database 260 then searches the active Walsh codes and corresponding BF coefficients for the sector and selects the Walsh code(s) whose BF weight vector(s) has the least correlation with the estimated BF weight vector of the new mobile station. Thus:

$$i = \arg\{\min[|b^*_{MS} b(i)|]\}, \text{ for } i=1, 2, 3, \ldots Q;$$

$$WC_{MS} = WC(i);$$

where Q is the number of active users. If the search determines that a group of Walsh codes share the same BF coefficient, then resource management controller and database 260 select the Walsh code which is less assigned among currently active resources (process step 425). Resource management controller and database 260 then executes a hashing function or other selection algorithm to assign a Walsh code from the set of Walsh codes identified by resource management controller and database 260 (process step 430).

Thereafter, base station 101 and resource management controller and database 260 enter a Call Active state in which the channel element, the Walsh code, the BF weight vector, and the sector are all assigned (process step 435). A call softer handoff (i.e., a sector-to-sector handoff) causes resource management to controller and database 260 to test if the Walsh code is active in an adjacent sector of base station 101 (process step 445). If the mobile station enters a softer handoff process, resource management controller and database 260 loads the downlink BF weight vector of the mobile station in the handoff sensed by antenna array of the adjacent candidate sector (process step 450). The algorithm then loops back and executes the Walsh Code and BF weight search described for process step 425 using with the new BF weight vector.

Assuming no handoff occurs, base station 101 and the mobile station continue communicating using the assigned Walsh code until a call release signal is received. If a call release signal is received, resource management controller and database 260 is notified to release and mark as idle the channel element (CE), the Walsh code (if not used by another CE), and other sector resources for use by another call (process steps 455 and 460).

Returning now to FIG. 3, two different scenarios are considered. In the first scenario, the new (or candidate) mobile station (NEW MS) is not in the softer handoff region and there are currently three (3) different beams (B1, B2, and B3) occupied by a number of active mobile stations. It is assumed that sector A of base station 101 is operating with all Walsh codes used to support traffic channels.

The new mobile station (NEW MS) requests service in Sector A. The downlink beamforming coefficients BNEW are estimated by adaptive antenna array and beamforming controller 252 and algorithm described in FIG. 4 is executed in base station 101. Resource management controller and database 260 determines that $B_{NEW}$ of NEW MS has the minimum correlation with the beamforming coefficients of beam B1. By way of example, assume that Walsh Codes (W20-W31, W33-W44) are used in beam B1. Starting from the first Walsh code in that group (i.e., WC20), resource management controller and database 260 searches for the Walsh code that is least used and, when it finds a Walsh code that is used only once, that Walsh Code is assigned to NEW MS.

In the second scenario, NEW MS is located in the softer handoff region between Sector A and Sector B. In this scenario, the new beamforming weight vector of the candidate user (NEW MS) seen by Sector B is loaded and resource management controller and database 260 is notified to execute a search algorithm within the new table for Sector B. In other words, for whichever sector to which the mobile station is handed off, resource management controller and database 260 executes the WC allocation algorithm using the table for that sector.

The algorithm provided by the present invention relies on the minimum correlation criteria between downlink beams. This is because signal maximization is considered when constructing downlink beams. Therefore, multiple users may fall into the same beams. However, if interference nulling is considered instead of signal maximization, the algorithm of the present invention needs modification such as using carrier-to-interference ratio (C/I) or some other measures as the criteria when assigning Walsh Codes.

Although the present invention has been described in detail, those skilled in the art should understand that they can make various changes, substitutions and alterations herein without departing from the spirit and scope of the invention in its broadest form.

What is claimed is:

1. For use in a base station of a code division multiple access (CDMA) wireless network, wherein said base station communicates with a plurality of wireless access terminals using transmit beams formed by an adaptive antenna array, an apparatus for allocating orthogonal codes used for downlink transmissions to said plurality of wireless access terminals comprising:

a database capable of storing R active wireless terminal records, each of said R active wireless terminal records containing: 1) an active orthogonal code and 2) corresponding downlink beamforming coefficients used to communicate with one of said wireless access terminals; and a controller associated with said database capable of receiving a notification that a new wireless access terminal is accessing said base station and, in response to said notification, comparing said each of said R active wireless terminal records to new downlink beamforming coefficients suitable for forming a downlink transmit beam for transmitting to said new wireless access terminal and, in response to said comparison, determines at least one active wireless terminal record containing corresponding downlink beamforming coefficients that have the least correlation with said new downlink beamforming coefficients.

2. The apparatus as set forth in claim 1 wherein said controller assigns an active orthogonal code in said at least one active wireless terminal record to be used in downlink transmissions to said new wireless access terminal.

3. The apparatus as set forth in claim 2 wherein said base station uses up to K orthogonal codes for said downlink transmissions and said controller compares said each of said R active wireless terminal records to said new downlink beamforming coefficients in response to a determination that all of said K orthogonal codes are in use.

4. The apparatus as set forth in claim 3 wherein said controller determines a first plurality of active wireless terminal records containing corresponding downlink beamforming coefficients that have the least correlation with said new downlink beamforming coefficients and further determines from said first plurality of active wireless terminal records a first active wireless terminal record containing an active orthogonal code used for downlink transmissions to a least number of said plurality of wireless access terminals.

5. The apparatus as set forth in claim 4 wherein said controller assigns said active orthogonal code in said first active wireless terminal record to be used in downlink transmissions to said new wireless access terminal.

6. The apparatus as set forth in claim 2 wherein said base station is operable to communicate in S sectors of a cell site associated with said base station and said base station uses up to K orthogonal codes in each of said S sectors for said downlink transmissions and wherein said controller compares said each of said R active wireless terminal records to said new downlink beamforming coefficients in response to a determination tat all of said K orthogonal codes are in use in a first sector in which said new wireless access terminal is accessing said base station.

7. The apparatus as set forth in claim 6 wherein said controller determines a first plurality of active wireless terminal records containing corresponding downlink beamforming coefficients that have the least correlation with said new downlink beamforming coefficients and further determines from said first plurality of active wireless terminal records a first active wireless terminal record containing an active orthogonal code used for downlink transmissions to a least number of said plurality of wireless access terminals.

8. The apparatus as set forth in claim 7 wherein said controller assigns said active orthogonal code in said first active wireless terminal record to be used in downlink transmissions to said new wireless access terminal.

9. The apparatus as set forth in claim 2 wherein said controller receives said new downlink beamforming coefficients from a beamforming controller that determines said new downlink beamforming coefficients from an uplink signal transmitted by said new wireless access terminal.

10. The apparatus as set forth in claim 2 wherein said base station is operable to communicate in S sectors of a cell site associated with said base station and said new wireless access terminal is being handed off from a first sector of said cell site to a second sector of said cell site, wherein said each of said R active wireless terminal records are associated with said second sector and said controller receives said new downlink beamforming coefficients from active wireless terminal records associated with said first sector.

11. A code division multiple access (CDMA) wireless network comprising a plurality of base stations, each of said base stations communicating with a plurality of wireless access terminals using transmit beams formed by an adaptive antenna array, wherein said each base station comprises:
   an apparatus for allocating orthogonal codes used for downlink transmissions to said plurality of wireless access terminals comprising:
      a database capable of storing R active wireless terminal records, each of said R active wireless terminal records containing: 1) an active orthogonal code and 2) corresponding downlink beamforming coefficients used to communicate with one of said wireless access terminals; and
      a controller associated with said database capable of receiving a notification that a new wireless access terminal is accessing said each base station and, in response to said notification, comparing said each of said R active wireless terminal records to new downlink beamforming coefficients suitable for forming a downlink transmit beam for transmitting to said new wireless access terminal and, in response to said comparison, determines at least one active wireless terminal record containing corresponding downlink beamforming coefficients that have the least correlation with said new downlink beamforming coefficients.

12. The CDMA wireless network as set forth in claim 11 wherein said controller assigns an active orthogonal code in said at least one active wireless terminal record to be used in downlink transmissions to said new wireless access terminal.

13. The CDMA wireless network as set forth in claim 12 wherein said base station uses up to K orthogonal codes for said downlink transmissions and said controller compares said each of said R active wireless terminal records to said new downlink beamforming coefficients in response to a determination that all of said K orthogonal codes are in use.

14. The CDMA wireless network as set forth in claim 13 wherein said controller determines a first plurality of active wireless terminal records containing corresponding downlink beamforming coefficients that have the least correlation with said new downlink beamforming coefficients and further determines from said first plurality of active wireless terminal records a first active wireless terminal record containing an active orthogonal code used for downlink transmissions to a least number of said plurality of wireless access terminals.

15. The CDMA wireless network as set forth in claim 14 wherein said controller assigns said active orthogonal code in said first active wireless terminal record to be used in downlink transmissions to said new wireless access terminal.

16. The CDMA wireless network as set forth in claim 12 wherein said base station is operable to communicate in S sectors of a cell site associated with said base station and said base station uses up to K orthogonal codes in each of said S sectors for said downlink transmissions and wherein said controller compares said each of said R active wireless terminal records to said new downlink beamforming coefficients in response to a determination that all of said K orthogonal codes are in use in a first sector in which said new wireless access terminal is accessing said base station.

17. The CDMA wireless network as set forth in claim 16 wherein said controller determines a first plurality of active wireless terminal records containing corresponding downlink beamforming coefficients that have the least correlation with said new downlink beamforming coefficients and further determines from said first plurality of active wireless terminal records a first active wireless terminal record containing an active orthogonal code used for downlink transmissions to a least number of said plurality of wireless access terminals.

18. The CDMA wireless network as set forth in claim 17 wherein said controller assigns said active orthogonal code in said first active wireless terminal record to be used in downlink transmissions to said new wireless access terminal.

19. The CDMA wireless network as set forth in claim 12 wherein said controller receives said new downlink beamforming coefficients from a beamforming controller that determines said new downlink beamforming coefficients from an uplink signal transmitted by said new wireless access terminal.

20. The CDMA wireless network as set forth in claim 12 wherein said base station is operable to communicate in S sectors of a cell site associated with said base station and said new wireless access terminal is being handed off from a first sector of said cell site to a second sector of said cell site, wherein said each of said R active wireless terminal records are associated with said second sector and said controller receives said new downlink beamforming coefficients from active wireless terminal records associated with said first sector.

21. For use in a base station of a code division multiple access (CDMA) wireless network, wherein the base station communicates with wireless access terminals using transmit beams formed by an adaptive antenna array, a method for allocating orthogonal codes used for downlink transmissions to wireless access terminals, the method comprising the steps of:
    storing R active wireless terminal records, each of the R active wireless terminal records containing: 1) an active orthogonal code; and 2) corresponding downlink beamforming coefficients used to communicate with one of the wireless access terminals;
    receiving a notification that a new wireless access terminal is accessing the base station;
    in response to the notification, comparing each of the R active wireless terminal records to new downlink beamforming coefficients suitable for forming a downlink transmit beam for transmitting to the new wireless access terminal; and
    in response to the comparison, determining at least one active wireless terminal record containing corresponding downlink beamforming coefficients that have the least correlation with the new downlink beamforming coefficients.

22. The method as set forth in claim 21 further comprising the step of assigning an active orthogonal code in the at least one active wireless terminal record to be used in downlink transmissions to the new wireless access terminal.

23. The method as set forth in claim 22 wherein the base station uses up to K orthogonal codes for the downlink transmissions and the step of comparing comprises the step of comparing each of the R active wireless terminal records to the new downlink beamforming coefficients in response to a determination that all of the K orthogonal codes are in use.

24. The method as set forth in claim 23 further comprising the steps of:
    determining a first plurality of active wireless terminal records containing corresponding downlink beamforming coefficients that have the least correlation with the new downlink beamforming coefficients; and
    determining from the first plurality of active wireless terminal records a first active wireless terminal record containing an active orthogonal code used for downlink transmissions to a least number of the wireless access terminals.

* * * * *